United States Patent [19]
Malone

[11] Patent Number: 4,579,014
[45] Date of Patent: Apr. 1, 1986

[54] INCREMENTAL DRIVE FOR A SEQUENTIAL TIMER

[75] Inventor: Charles F. Malone, Franklin, Tenn.

[73] Assignee: The Scott & Fetzer Company, Cleveland, Ohio

[21] Appl. No.: 647,816

[22] Filed: Sep. 6, 1984

[51] Int. Cl.$^4$ ............................................. F16H 29/12
[52] U.S. Cl. ......................................... 74/125; 74/160
[58] Field of Search ................. 74/112, 116, 122, 125, 74/55, 144, 160

[56] References Cited

U.S. PATENT DOCUMENTS

| | | | |
|---|---|---|---|
| 2,393,294 | 1/1946 | Crane | 74/118 |
| 2,552,457 | 5/1951 | Raskin | 74/125 |
| 2,618,196 | 11/1952 | Mitchell | 74/125 |
| 3,115,785 | 12/1963 | Simmons | 74/125 |
| 3,231,692 | 1/1966 | Plasko | 74/125 |
| 3,475,974 | 11/1969 | Brosseit | 74/55 |
| 3,818,769 | 6/1974 | Tigner et al. | 74/55 |
| 4,032,055 | 6/1977 | Costa | 74/125 |

OTHER PUBLICATIONS

Holt, "Ratchett Drive Mechanism", IBM Technical Disclosure Bulletin, vol. 8, No. 6, p. 902, Nov. 1965.

Primary Examiner—Lawrence J. Staab
Attorney, Agent, or Firm—Pearne, Gordon, Sessions, McCoy, Granger & Tilberry

[57] ABSTRACT

A sequential ratchet drive for an appliance timing cam is disclosed. The drive includes a pawl adapted to drive ratchet teeth located on the periphery of a main program cam in a step-by-step manner. The pawl is driven and guided by cams against and with the bias of springs in an initial tangential drive path in driving engagement with a ratchet tooth. The cams guide the pawl out of engagement with the driven tooth in a curvilinear retraction path with the bias of a first spring and against the bias of a second spring to a raised location and then the pawl is returned to its initial driving position by the bias of both springs. A portion of the path of travel of the pawl from its raised location to its initial position may be defined by a portion of a ratchet tooth so that the retraction path of the pawl may adapt itself to a variety of varying tooth spacings.

8 Claims, 8 Drawing Figures

INCREMENTAL DRIVE FOR A SEQUENTIAL TIMER

BACKGROUND OF THE INVENTION

This invention relates to appliance timers and particularly to a drive mechanism for the timing cam of an appliance timer.

Although the principles of the present invention may be included in various timers, a particular application is made in timers of the type employed to control the various circuits and functions of automatic laundry appliances, such as washers and dryers. Appliance timers basically comprise a rotatable member having a plurality of projecting cams which sequentially engage switch members which control the various operations of the appliance.

Basically, there are two types of timers for home appliances. One such timer is a cylindrical rotary drum having a plurality of cams projecting from its surface which engage switch members and is quite similar to a music box. A principal disadvantage of such a timer is that it is bulky and it is difficult to mount the timer in the limited space requirements dictated by the appliance manufacturer. A more acceptable timer as far as space requirements are concerned is the timer set forth in U.S. Pat. No. 2,703,347 to A. R. Constantine, issued Mar. 1, 1955. According to that patent, the appliance timer comprises a flat disc mounted in a housing and having ratchet teeth on its periphery. The disc is driven incrementally about a central shaft by a pawl, which in turn is driven in a reciprocal manner by a synchronous motor. At least one face of the disc is provided with arcuate cam surfaces which are concentrically arranged about the face or faces of the disc. Switch members are arranged to engage the arcuate cam members upon rotation of the disc, and control various cycles of the appliance.

While the teachings of the present invention are set forth herein with particular reference to a disc cam, it is to be understood that the invention may also be employed as a drive mechanism for a drum cam. In either case, it is desirable that the disc or drum be driven at a very slow rate of advance, since one rotation of the disc or drum should complete at least one entire cycle of the machine. Therefore, it is desirable to decrease the angular spacing between the ratchet teeth, and therefore shorten the stroke of the pawl to that spacing, and/or decrease the pawl stroke frequency by gear reduction from the drive motor.

Reducing the tooth-to-tooth spacing necessarily reduces the size of the teeth, and increases the possibility of the pawl to misengage or slip the ratchet teeth. Moreover, reducing the length of stroke of the pawl presents problems in designing suitable cam drives between the motor and the pawl. Generally, the cam disc is designed so that tooth-to-tooth spacing on a disc having a diameter of about 4¼ inches is between 2½ to 8 degrees.

In addition to the problems presented in the design of mechanisms for precise pawl and ratchet cooperation, manufacturing tolerances for those mechanisms must be closely controlled to minimize malfunctions.

SUMMARY OF THE INVENTION

This invention overcomes many of these prior art problems, and provides a pawl cycling mechanism which is sensitive to and compatible with a wide variety of tooth-to-tooth spacings between the ratchet teeth.

Thus, the pawl driving mechanism according to this invention is adapted to advance and retract a pawl along a fixed and predetermined path of travel. The mechanism, however, permits the pawl to adapt to different spacings between the ratchet teeth so that a single pawl driving mechanism may be employed to drive a cam disc or drum having a tooth spacing that may vary from 3 degrees to 8 degrees, for example. Since the mechanism is so designed, it is not necessary to maintain close manufacturing tolerances for the ratchet teeth. Also, since the drive mechanism permits the pawl to adapt itself to different spacings between ratchet teeth, the ratchet teeth on a single disc or drum need not be uniformly spaced. This is desirable since a short tooth spacing dictates small incremental advances of the cam disc which are generally desirable in view of the increasing number of operations which must be accounted for in one revolution of the cam. On the other hand, large tooth-to-tooth spacing provides for a relatively rapid advance of the disc or drum cam, which is desirable during switching operations, since a rapid advance during switching increases the accuracy of those operations and decreases arcing and since slow make-break switching promotes arcing, and therefore increased switch wear.

The timer according to the illustrated and described embodiment of this invention comprises a disc mounted for rotation within a relatively flat casing. The disc is provided with a number of arcuate and concentric cams on at least one of its faces. A plurality of cam-actuated switches cooperate with the arcuate cams to control the various switching functions of the appliance. A preselected array of ratchet teeth is provided on the periphery of the disc and a pawl is provided to drive the disc by engaging the teeth. A mechanism is provided to drive the pawl in a tangential drive path to provide an incremental advance for the circular flat cam disc. At the completion of the drive stroke, the pawl is retracted from the driven tooth and follows a curvilinear path to the following tooth notch. During the portion of the curvilinear path which constitutes retraction from the advanced notch, the pawl is mechanically guided by cams against the bias of springs which tend to retract and draw the pawl into the following notch. During that portion of the curvilinear path which constitutes advancement toward the following notch, the pawl is drawn by the biasing members toward the following notch. However, the path of travel of the pawl may be interrupted by tooth portions, but the biasing members are adapted to draw the pawl to a proper initial drawing position in the following toothed notch to condition the pawl for its driving stroke. Thus, the retracting pawl may engage a portion of a tooth to be driven, but such engagement will not interfere with the proper initial positioning of the pawl for its next stroke.

The mechanism according to the present invention provides a dependable and rugged pawl and ratchet mechanism which exerts a minimum amount of pawl pressure on the tooth during its retraction stroke but exerts a positive and direct drive stroke to the ratchet teeth. The drive stroke is tangential with respect to the disc cam and a tangential drive stroke is the most efficient application of force to a disc for rotational drive thereof.

DETAILED DESCRIPTION OF THE INVENTION

Figure 1:
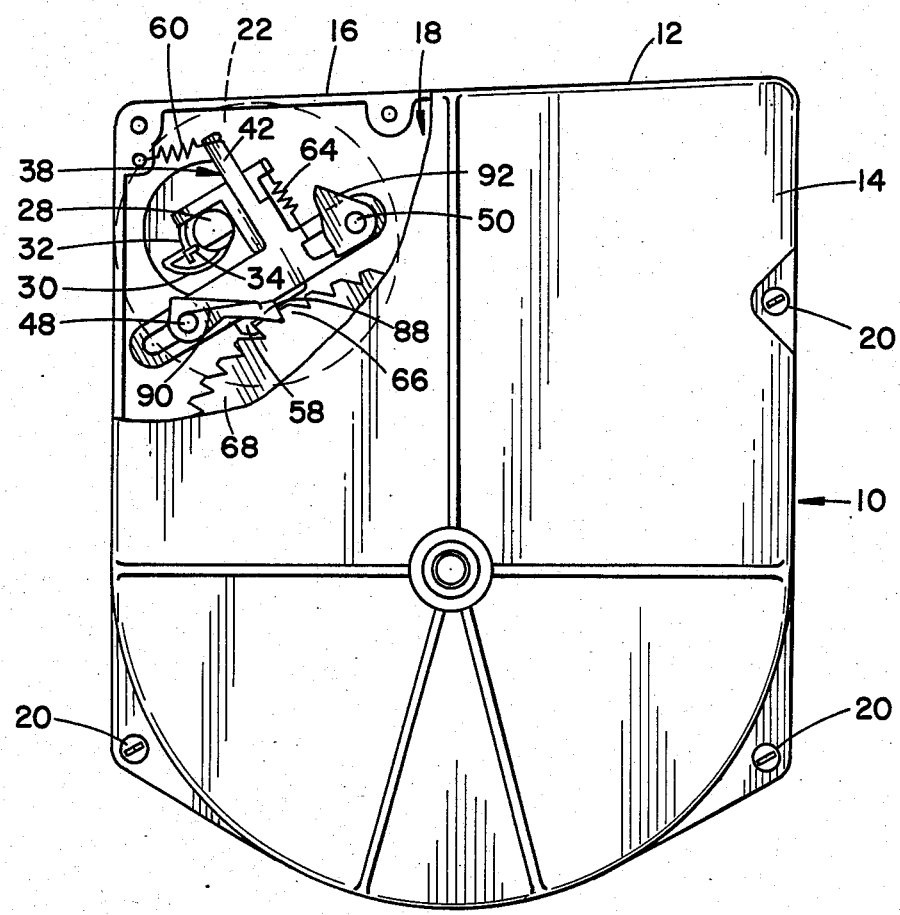
FIG. 1 is a plan view of an appliance timer according to this invention, with portions of the timer broken away to show details of the operation.

Referring now to the drawings, and particularly to FIG. 1, there is illustrated a sequential timer 10 for appliances such as dishwashers, clothes washers, clothes dryers, and the like, which includes a casing 12. The casing 12 comprises two identical and mating halves 14 and 16, which cooperate to form a relatively narrow chamber 18. The mating halves 14 and 16 are held together by a plurality of bolts 20. A synchronous motor 22 is mounted on the casing half 16 by fasteners 24, and has an output shaft 26 which is keyed to and drives a camshaft 28 at a very slow rate of speed. The camshaft 28 has a rapid advance cam 30, a dwell cam 32, and a rise cam 34. The cams 30-34 cooperate with a carrier slide 36 and a cross slide 38 mounted on the carrier slide. The carrier slide includes a shuttle portion 40 and a guide portion 42. A pair of elongated apertures 44 and 46 are provided on the ends of the shuttle portion 40 and respectively receive stationary pins 48 and 50 which are molded into and project from the casing half 16. The guide portion 42 of the carrier slide 36 is slidingly embraced by a channel 52 formed by parallel side rails 54 and 56 of the cross slide 38, and one end of the cross slide 38 is configured to provide a pawl tooth 58.

Figure 3:
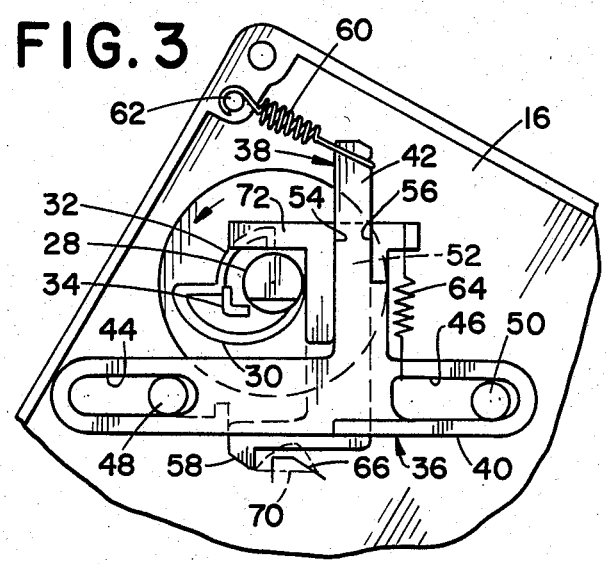
FIGS. 3 through 7 are plan views of the pawl mechanism according to this invention, showing the mechanism in successive positions during a cycle of its operation.
Figure 4:
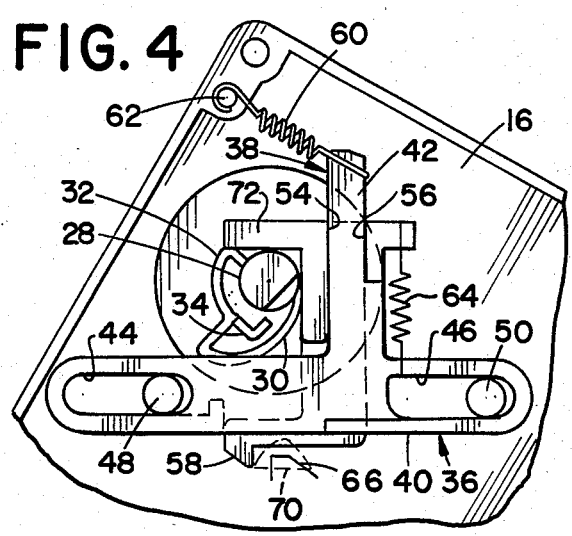

The carrier slide 36 and the cross slide 38 are normally biased to the position illustrated in FIGS. 3 and 4 by a spring 60 which extends between one end of the guide portion 42 and a pin 62 extending from the casing half 16, which tends to bias the carrier slide 36, and therefore the cross slide 38, to the extreme leftward position as viewed in FIG. 3, and by a spring 64 which extends between the carrier slide 36 and the cross slide 38 to bias the cross slide downwardly as viewed in FIGS. 3 and 4, with the tooth 58 in its extended position. The net biasing force on the tooth 58, therefore, is leftward and downward, as is viewed in FIGS. 3 and 4.

The tooth 58 is adapted to engage and drive a succession of ratchet teeth 66 which are provided about the periphery of a disc cam 68 (FIG. 1). The disc cam 68 is provided with a plurality of concentrically spaced, arcuate cam surfaces (not shown) on at least one face for sequential operation of function controlling switches in the timer. A more detailed description of this arrangement may be found in the aforementioned patent to Constantine U.S. Pat. No. 2,703,347 and in U.S. Pat. No. 4,319,101.

Figure 5:
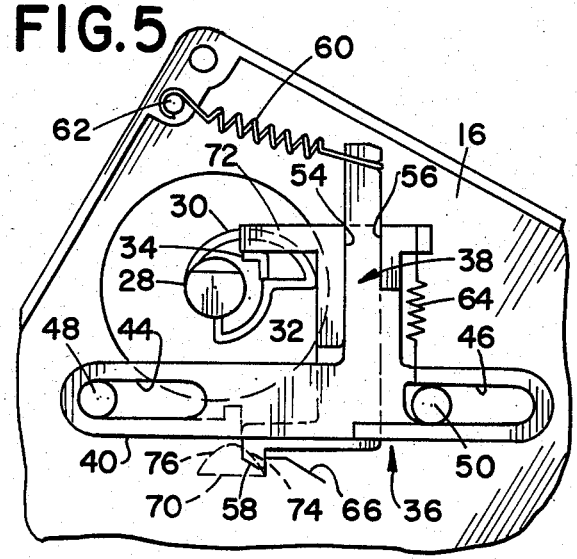
Figure 6:
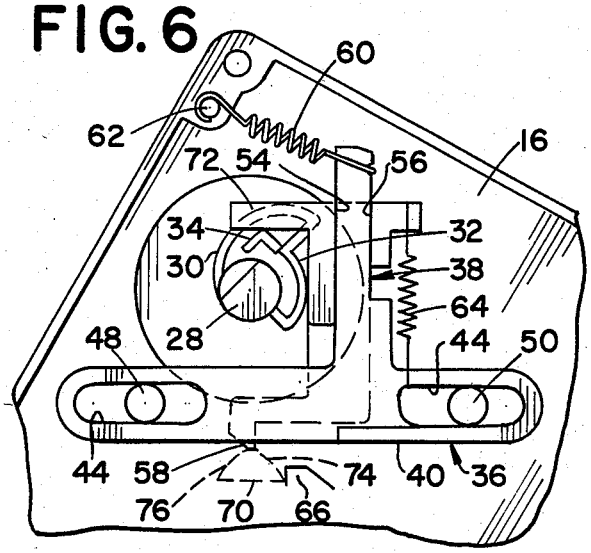
Figure 7:
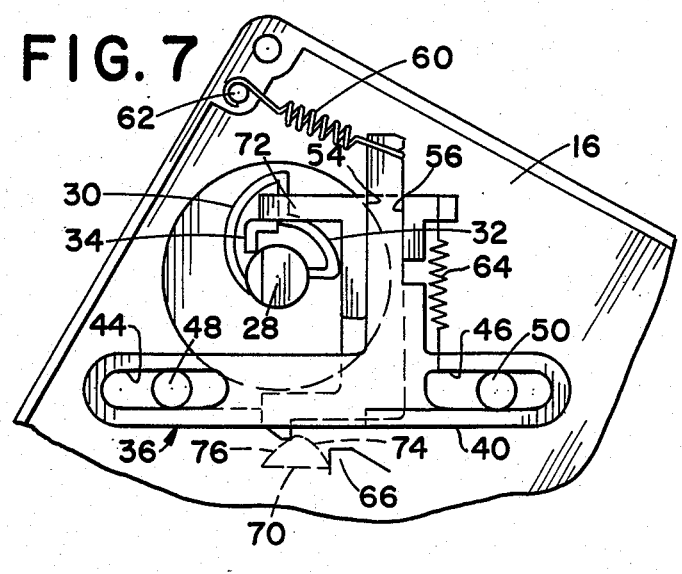

Upon counterclockwise rotation of the camshaft 28 from the position illustrated in FIG. 3 to the position illustrated in FIG. 4, the carrier slide 36 and the cross slide 38 remain biased in their dwell position, as is illustrated. When the rapid advance cam 30 engages the side rail 54 of the cross slide 38, as is illustrated in FIG. 4, the carrier slide 36 is driven to the right to the position illustrated in FIG. 5. During this movement, the tooth 58 is engaged with and drives the ratchet tooth 66 to advance that tooth one increment in its travel. The tooth 58 follows a tangential drive path 70. When the rapid advance cam 30 reaches the extent of its advancement of the carrier slide against the bias of the spring 60 and the carrier slide attains the position illustrated in FIG. 5, the rise cam 34 engages an arm 72 on the cross slide 38 to lift the cross slide against the bias of the spring 64. As the rise cam 34 is lifting the cross slide 38, the rapid advance cam 30 leaves the side rail 54 and the dwell cam 32 engages the rail 54, as may be seen in FIG. 6. As the camshaft 28 is rotated from the position illustrated in FIG. 5 to the position illustrated in FIG. 6, the rise cam 34 lifts the cross slide 38 to its fully raised position while the spring 60 retracts the carrier slide 36 so that the tooth 58 follows a return path 74 to its topmost return position 75. Further rotation of the camshaft 28 to the position illustrated in FIG. 7 causes a momentary dwell of the carrier slide 36 by the dwell cam 32. Further movement of the camshaft 28 returns the carrier slide 36 and the cross slide 38 to the position illustrated in FIG. 3. During that increment in the operation of the device, the pawl tooth 58 generally follows a path 76 which is not influenced by the cams 30-34. The cams, however, are sensitive to the shape of a tooth 66 on the cam disc 68. In this regard, the teeth 66 themselves may be considered as cams which guide the tooth 58 to its proper position for its driving stroke.

Figure 8:
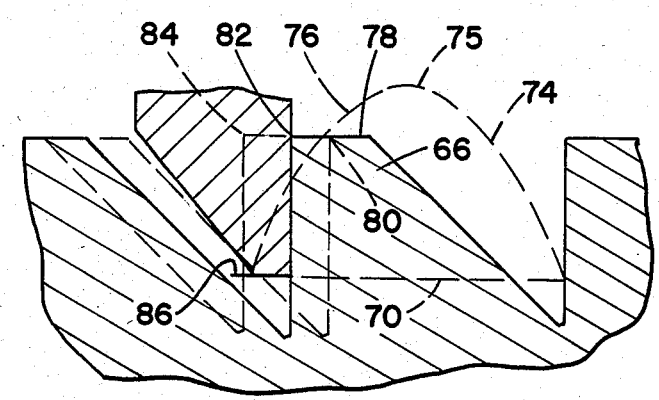
FIG. 8 is a schematic representation of the path of travel of the ratchet tooth in relation to various tooth sizes.
Figure 2:
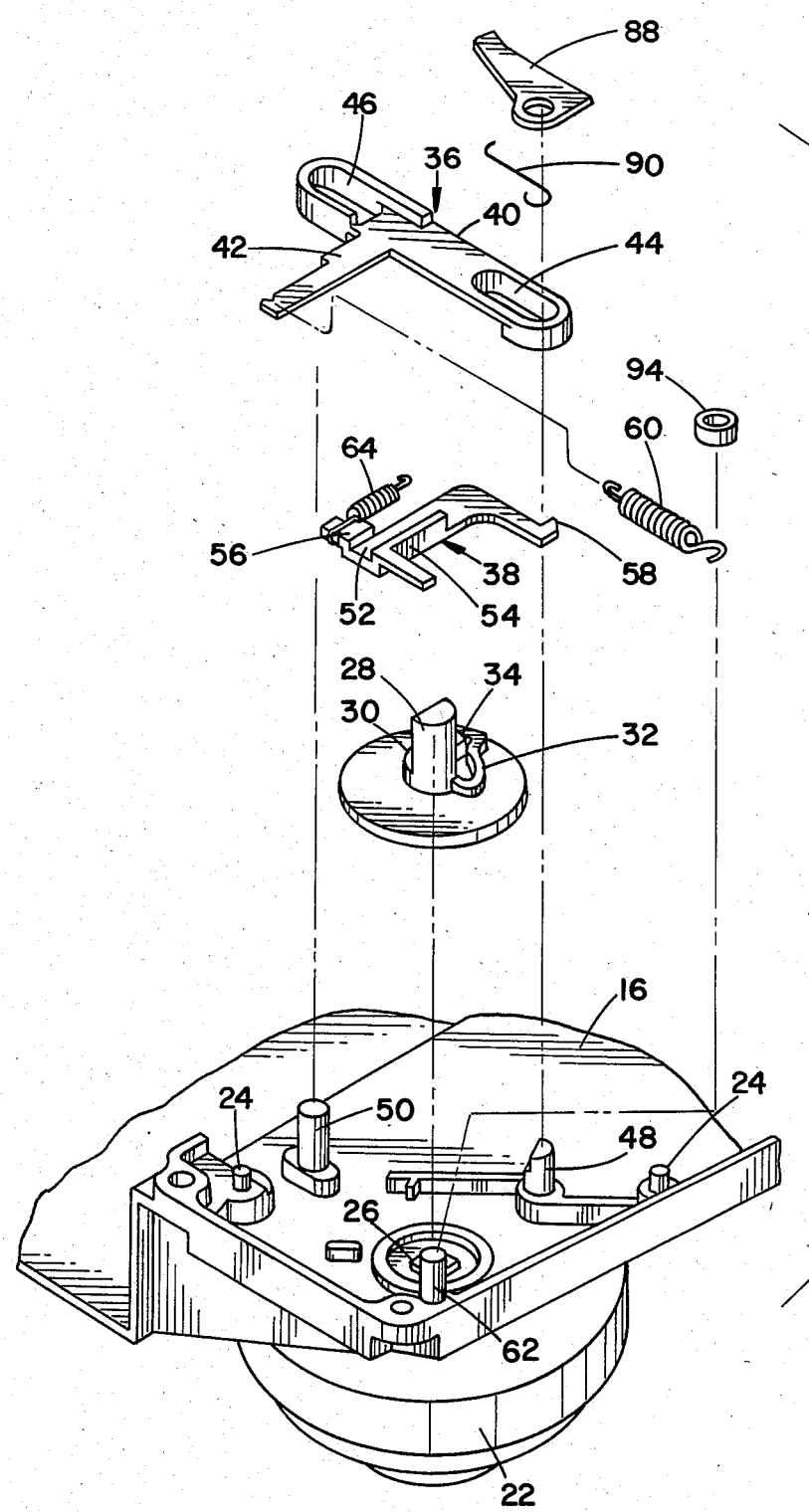
FIG. 2 is a fragmentary, exploded view of the drive pawl mechanism according to this invention.

Referring now to FIG. 8, the sensitivity of the pawl tooth 58 to a ratchet tooth 66 will become apparent. From the apex portion 75 of its return path 74, the tooth 58 then follows a typical return path 76 as a result of the biasing of the springs 60 and 64. This path may be altered by contact with the shoulder portion 78 of a ratchet tooth 66. If a tooth 66 has, for example, a three-degree spacing about the periphery of the disc cam 68, its shoulder 78 terminates at a location designated by the reference numeral 80. It may be noted, therefore, that the tooth 58 following the path 76 will clear the shoulder 78 on such a tooth and follow the typical path 76 illustrated. However, if the tooth 66 has, for example, a four-degree spacing, its shoulder 78 will terminate at a location indicated by the reference numeral 82. The path 76 will therefore be interrupted by a projecting portion of the shoulder 78, but the tooth 58 will merely ride over the shoulder to once again conform to the path 76. If the tooth 66 has a five-degree spacing, the shoulder 78 will terminate at a location designated by the reference numeral 84. Again, in this instance, the tooth 58 will ride over the shoulder 78 until it achieves its fixed starting position at a location designated by the reference numeral 86. It may be noted that the location 86 establishes one end of the drive path 70 and that the end of the return path 76 is spaced from the location 86 on the drive path 70. This situation obtains as a result of the fact that the rise cam 34 leaves the arm 72 just before the dwell cam 32 releases the side rail 54 so that the tooth 58 is fully extended prior to the full retraction of the carrier slide 36.

To negate any tendency for the disc cam 68 to be backed up by the tooth 58 as it engages the shoulder 78, a no-back pawl 88 is provided. The pawl 88 is pivotally mounted on the pin 48 and is lightly biased into engagement with the disc cam 68 by a wire spring 90 to hold the cam 68 against back-up as the tooth 58 is retracted to a driving position. A plate 92 (fragmentarily shown in FIG. 1) and a spacer 94 hold the pawl assembly in its proper position in the chamber 18.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. In a sequential ratchet drive for a timing cam comprising a housing means, a main program cam having arcuate switch actuating cams on a surface thereof, a plurality of switches mounted in said housing and being sequentially actuated by said arcuate cams upon rotation of said program cam, and drive means including a constant speed motor, said program cam having a set of circularly arranged ratchet teeth on its periphery, in combination therewith, the improvement comprising drive pawl means for driving said program cam in a step-by-step manner by engagement of successive ratchet teeth, said drive pawl means including camshaft means driven by said motor, a carrier slide driven by said camshaft in a rectilinear path substantially tangential to said program cam, including a cross slide carried by said carrier slide and driven by said camshaft in a path substantially radial to said program cam, said cross slide having a pawl tooth sequentially engaging and driving said ratchet teeth from an initial driving position upon radial movement of said cross slide and tangential movement of said carrier slide, and including means for biasing said carrier slide and said cross slide against said camshaft means and to said initial driving position prior to driving one of said successive ratchet teeth by said drive pawl means.

2. The improvement according to claim 1, wherein said carrier slide is driven by said camshaft during its tangential movement against the bias of a spring, wherein said cross slide is driven by said camshaft during a first portion of a retraction path of said drive pawl means against the bias of a spring while said camshaft guides said carrier slide along said retraction path, and wherein said biasing means return said carrier slide and said cross slide along a second portion of said retraction path to said initial driving position.

3. The improvement according to claim 2, wherein a portion of one of said circularly arranged ratchet teeth defines at least a portion of said second portion of said retraction path.

4. The improvement according to claim 1, wherein said camshaft has first, second, and third cam lobes, said carrier slide being driven by said first cam lobe in a rectilinear path substantially tangential to said disc, wherein said cross slide is driven by said second cam lobe in a radially outward direction with respect to the cam disc and wherein said third cam lobe maintains said carrier slide at a fixed position.

5. In a sequential ratchet drive for a timing cam comprising a housing means, a main program cam comprising a circular flat programmed disc having arcuate switch actuating cams on at least one face thereof, a plurality of switches mounted in said housing and being sequentially actuated by said arcuate cams upon rotation of said programmed disc, and drive means including a constant speed motor, said disc having a set of circularly arranged ratchet teeth on its periphery, in combination therewith, the improvement comprising drive pawl means for driving said disc in a step-by-step manner by engagement of successive ratchet teeth, said drive pawl means including camshaft means driven by said motor, a carrier slide driven by said camshaft in a rectilinear path substantially tangential to said disc, including a cross slide carried by said carrier slide and driven by said camshaft in a path substantially radial to said disc, said cross slide having a pawl tooth sequentially engaging and driving said ratchet teeth from an initial driving position upon radial movement of said cross slide and tangential movement of said carrier slide, and including means for biasing said carrier slide and said cross slide against said camshaft means and to said initial driving position prior to driving one of said ratchet teeth by said drive pawl means.

6. A sequential ratchet drive for a timing cam comprising housing means, a main program cam, drive means including a constant speed motor, said program cam having a set of circularly arranged ratchet teeth on its periphery, drive pawl means driven by said motor for driving said program cam in a step-by-step manner by engagement of successive ratchet teeth, means to repeatedly advance said pawl in a first direction along a rectilinear drive path tangential to said program cam and in engagement with successive teeth from a first retracted position to a second advanced position, to retract said pawl in a second direction along a curvilinear retraction path from said second advanced position to a third position at the apex of said retraction path and then to said first retracted position.

7. A sequential ratchet drive for a timing cam according to claim 6, wherein said pawl is advanced to said second advanced position along said rectilinear drive path by cam means against the bias of first spring means, wherein said pawl is retracted along said curvilinear retraction path to said third position by the bias of said first spring means and against the bias of second spring means, and wherein said pawl is returned from said third position to said first position along said retraction path by the bias of both said first and second spring means.

8. A sequential ratchet drive according to claim 7, wherein at least a portion of the retraction path between said third and first positions is defined by a portion of a ratchet tooth.

* * * * *